Figure 1:
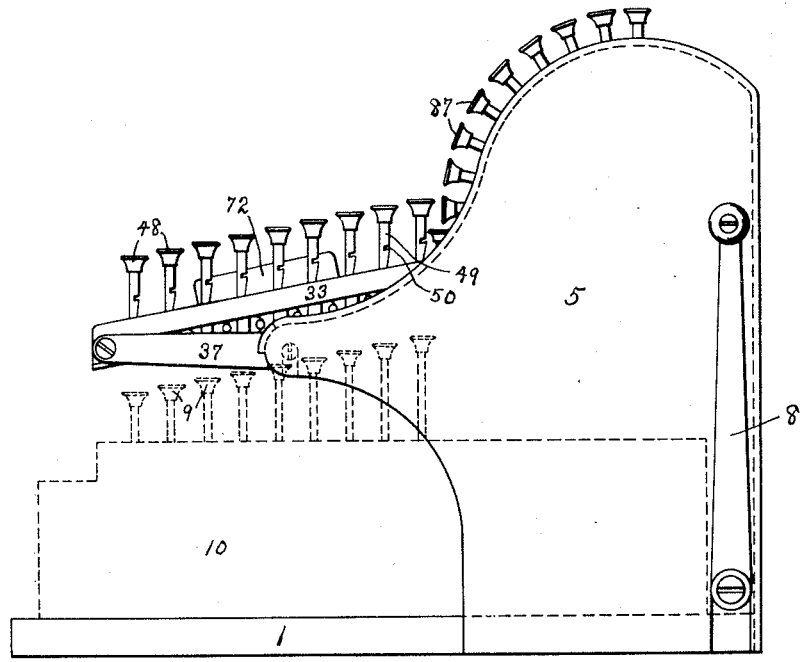

S. HORR & W. B. TRAVIS.
MULTIPLYING MACHINE.
APPLICATION FILED JULY 22, 1911.

1,011,057.

Patented Dec. 5, 1911.
6 SHEETS—SHEET 1.

Witnesses
Albert A. Hofmann
E. M. Brown

Inventors
Stephen Horr and
William B. Travis.
By Edward N. Pagelsen.
Attorney

S. HORR & W. B. TRAVIS.
MULTIPLYING MACHINE.
APPLICATION FILED JULY 22, 1911.

1,011,057.

Patented Dec. 5, 1911.
6 SHEETS—SHEET 2.

Witnesses
Albert A. Hofmann
E. M. Brown

Inventors
Stephen Horr and
William B. Travis.
By Edward N. Pagelsen
Attorney

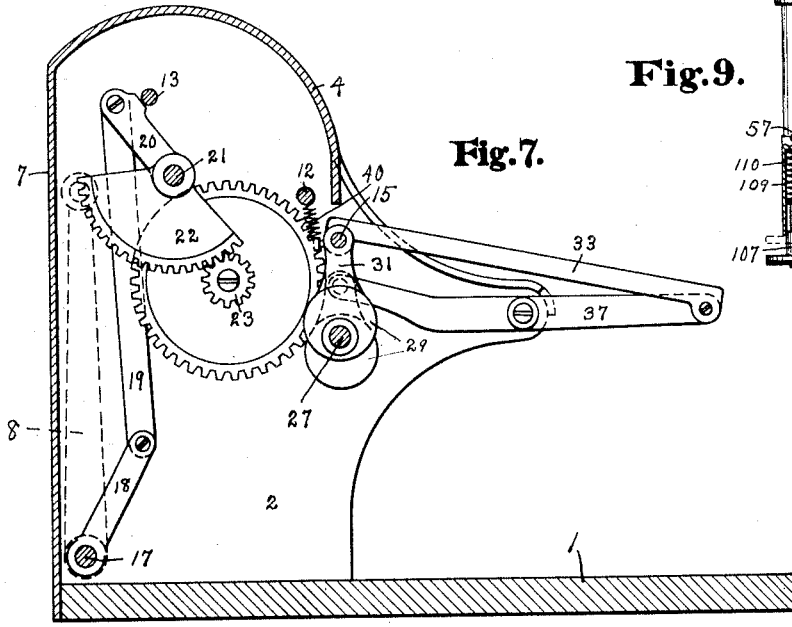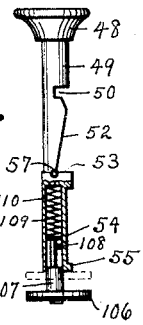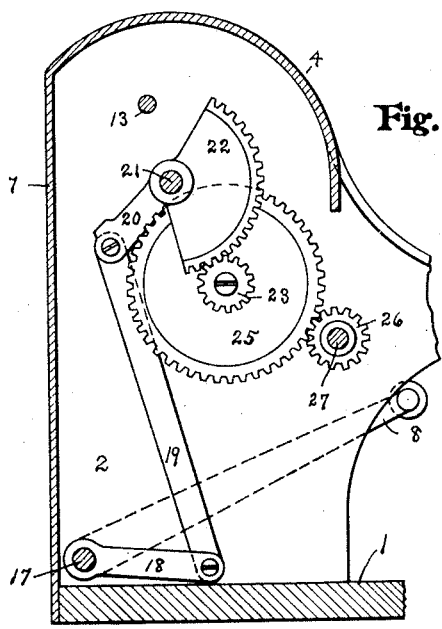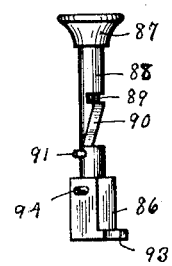

S. HORR & W. B. TRAVIS.
MULTIPLYING MACHINE.
APPLICATION FILED JULY 22, 1911.
1,011,057.
Patented Dec. 5, 1911.
6 SHEETS—SHEET 4.
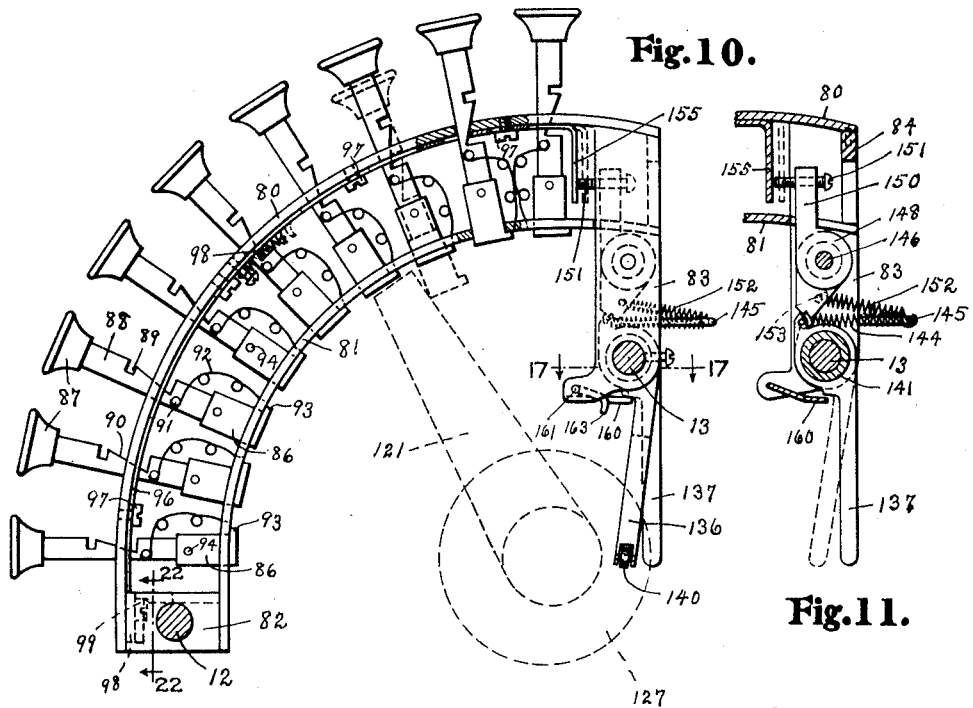
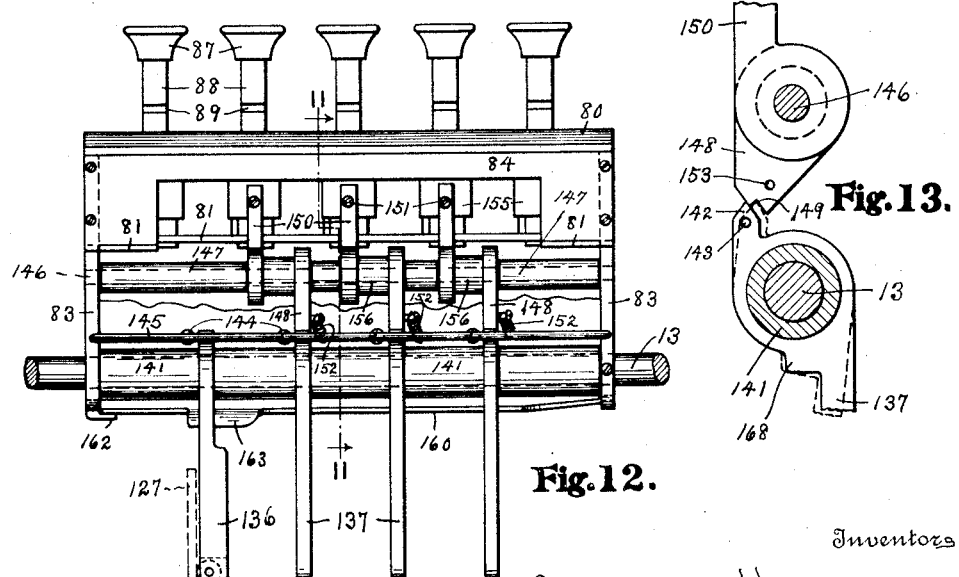
Witnesses
Albert A. Hofmann
E. M. Brown
Inventors
Stephen Horr and
William B. Travis.
By Edward N. Pagelsen
Attorney

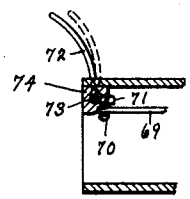
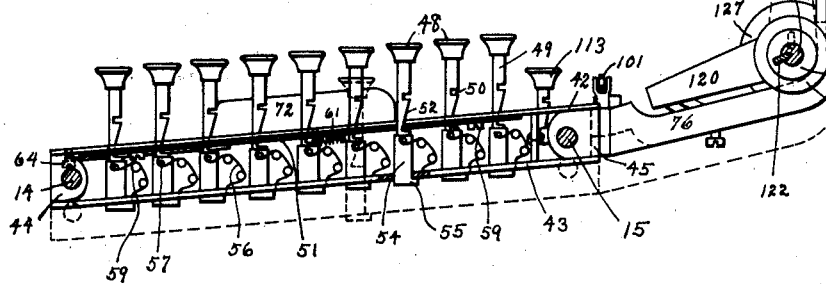
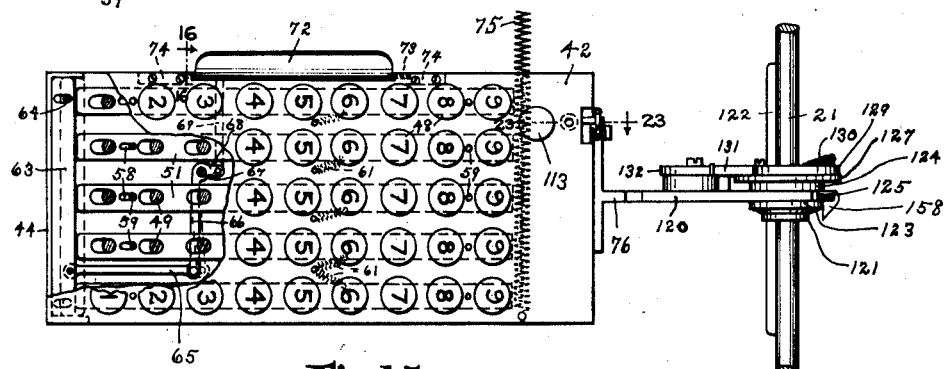
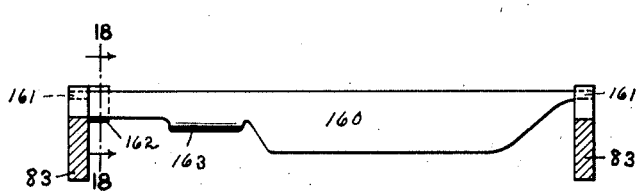
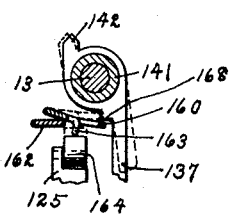

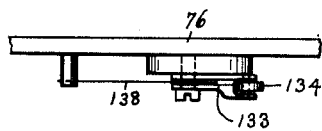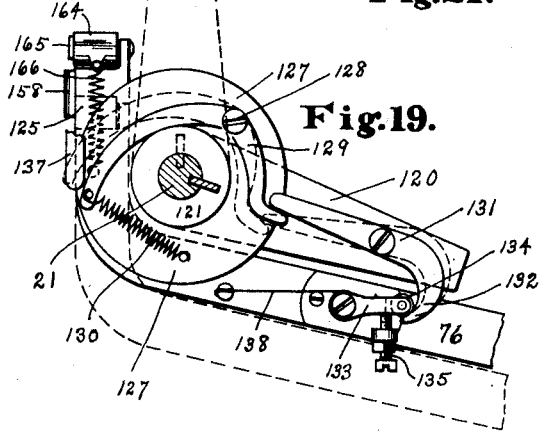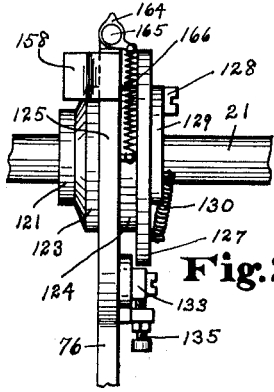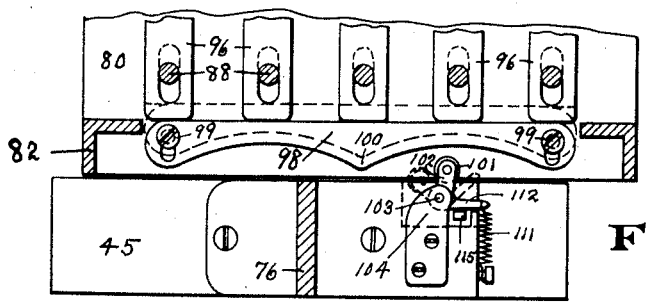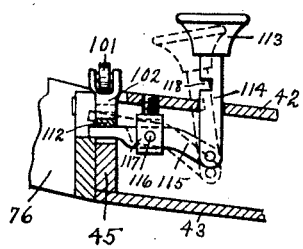

UNITED STATES PATENT OFFICE.

STEPHEN HORR AND WILLIAM B. TRAVIS, OF DETROIT, MICHIGAN.

MULTIPLYING-MACHINE.

1,011,057.             Specification of Letters Patent.        Patented Dec. 5, 1911.

Application filed July 22, 1911. Serial No. 639,897.

*To all whom it may concern:*

Be it known that we, STEPHEN HORR and WILLIAM B. TRAVIS, citizens of the United States, residing at Detroit, in the county of Wayne and State of Michigan, have invented a new and useful Multiplying-Machine, of which the following is a specification.

This invention relates to means for depressing the keys of adding machines, and its object is to so actuate the keys that the amount registered by the adding machine will be the product of two figures indicated by the keys of two independent key-boards of the multiplying machine.

This invention consists in a frame; of two key-boards, one for the multiplicand and the other for the multiplier; of mechanism for moving one of these key-boards up and down so that its keys will actuate the keys of a properly positioned adding machine; means for moving this key-board along so that the proper keys of higher denominations of the adding machine may be actuated; and of means for returning the movable key board to original position and for releasing all the depressed keys. Multiplication is performed by taking the multiplicand as units as many times as indicated by the unit figure of the multiplier, then as tens as many times as indicated by the tens figure of the multiplier and so on until all the figures in the multiplier have been taken into account, and then adding these several figures together. Thus 5432 may be multiplied by 29 by writing 5432 nine times with the 2 in the units column and then twice with the 2 in the tens column, and then adding. Mechanically, multiplication may be performed by means of a key-board having its keys spaced to register with the keys of an adding machine, together with means to move the key board up and down so that the selected keys will depress the corresponding keys of the adding machine. After a number of actuations equal the units of the multiplier, the key-board will be shifted one step, and actuated as many times as indicated by the ten figure of the multiplier, and so on. The limit of the figures which can be multiplied together will depend upon the size of the machines.

The machine shown in the drawings is automatic in its operation, the keys of the two key-boards controlling the entire operations.

Figure 3:
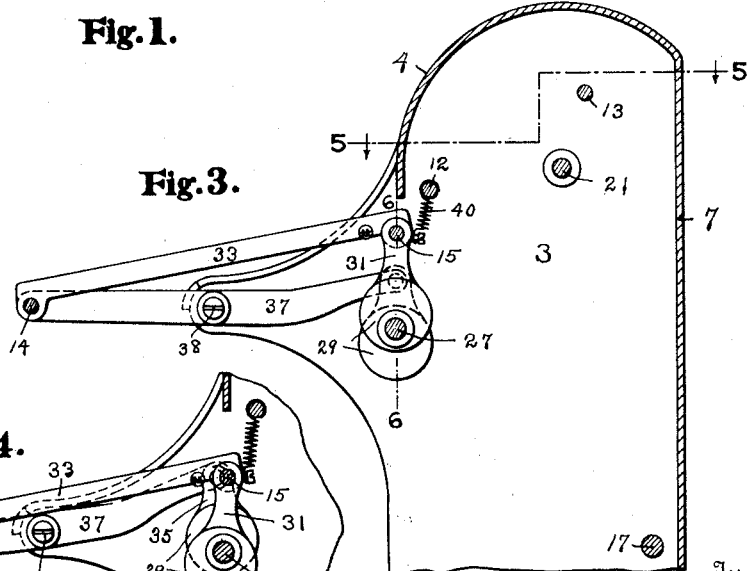
Figure 4:
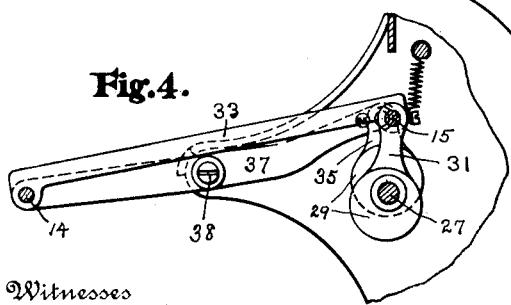
Figure 2:
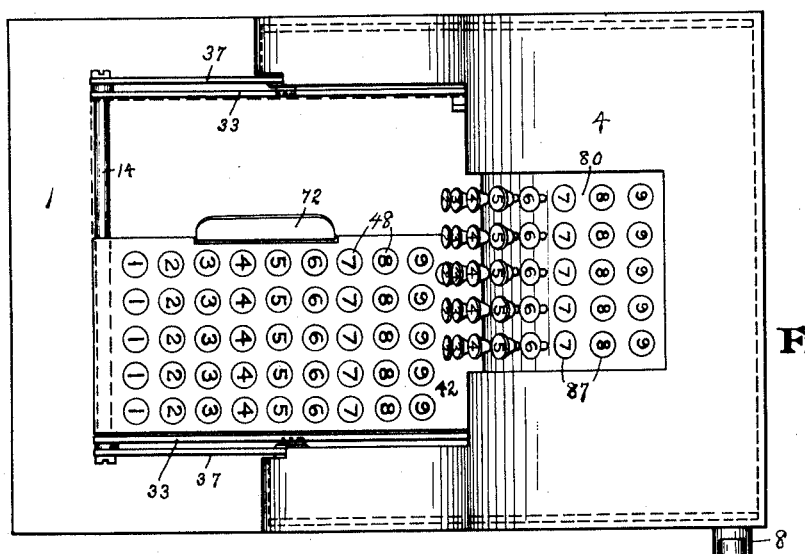
Figures 5, 6:
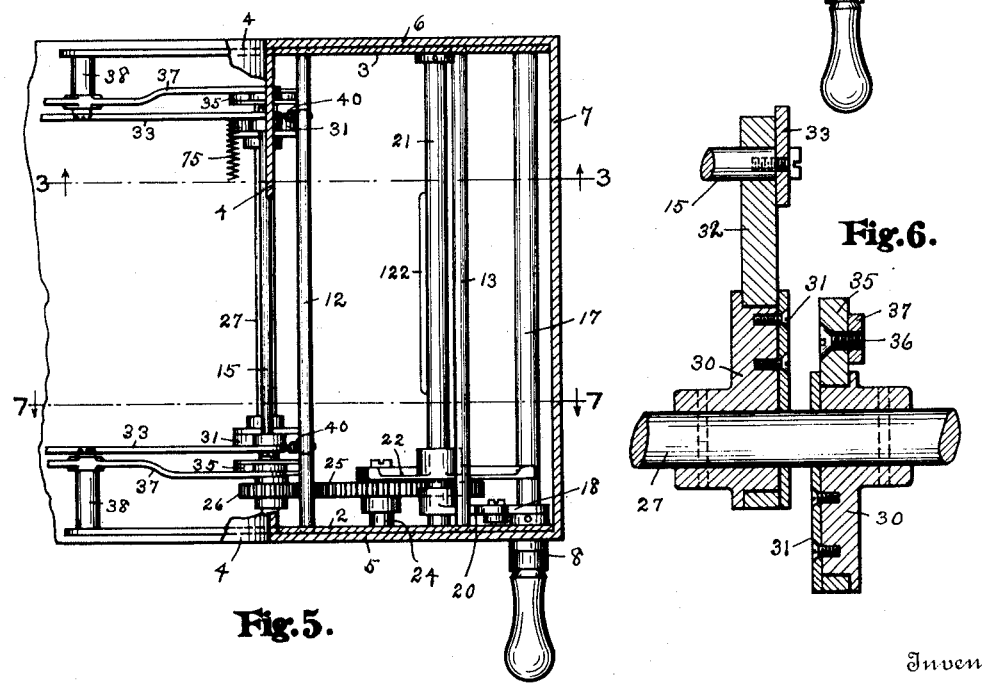

In the accompanying drawings, Figure 1 is a side elevation of the multiplying machine, with an adding machine indicated by dotted lines. Fig. 2 is a plan of the same. Figs. 3 and 4 are sections of a portion of the actuating mechanism on the line 3—3 of Fig. 5, showing the parts in two different positions. Figs. 5 and 6 are sections on the lines 5—5 and 6—6 of Fig. 3, respectively. Figs. 7 and 8 are sections on the line 7—7 of Fig. 5 showing parts of the actuating mechanism in different positions. Fig. 9 is an elevation of a key. Fig. 10 is a side elevation of the upper or multiplier key-board. Fig. 11 is a section on the line 11—11 of Fig. 12. Fig. 12 is a rear elevation of the upper key-board. Fig. 13 is an elevation on a larger scale of a portion of the details shown in Fig. 11. Fig. 14 is a side elevation of the lower or multiplicand key-board. Fig. 15 is a plan of the same. Fig. 16 is a detail on the line 16—16 of Fig. 15. Fig. 17 is a detail on the line 17—17 of Fig. 10. Fig. 18 is a detail on the line 18—18 of Fig. 17. Fig. 19 is a side elevation of a portion of the escapement. Fig. 20 is a rear elevation of the same. Fig. 21 is a detail of the same. Figs. 22 and 23 are details of the releasing mechanism of the keys of the upper board, the for er being on the line 22—22 of Fig. 10. Fig. 24 is an elevation of a key.

Similar reference characters refer to like parts throughout the several views.

As shown in the drawings, this machine has a base 1 and sides 2 and 3. A case extends over the open spaces around the movable parts beneath the key boards and consists of a top 4, sides 5 and 6, and back 7. The actuating mechanism is designed to reciprocate through variable arcs, depending upon the number of times the lower or multiplicand key-board is to be moved up and down, the number of movements of this key-board during the forward stroke of the operating handle or crank 8 being equal to those during the return stroke. At each forward stroke, the crank 8 will be stopped by one of the keys of the upper or multiplier key-board. The keys of the lower key-board engage and depress the keys 9 of the adding machine 10 which rests on the base 1. The keys of the lower board must therefore be spaced in the same manner as those of the selected adding machine. The upper key-board is mounted on two rods 12 and 13 having their ends secured in the sides 2 and 3. The lower key-board is mounted on the movable rods 14 and 15 as will be explained later on. The front of the machine is at the left in Figs. 1 and 2.

*The actuating mechanism.*—The crank 8 is secured to one end of the shaft 17, mounted in the sides 2 and 3, to which shaft is secured a crank arm 18. See Figs. 7 and 8. A link 19 connects this arm to a crank arm 20 on the upper shaft 21. Secured to this upper shaft is a toothed segment 22 which meshes with a pinion 23, revolubly mounted on the pin 24. A gear 25 is connected to this pinion and meshes with the pinion 26 on the main shaft 27. It will therefore be seen that the upper shaft 21 and the main shaft 27 will be revolved by the crank 8.

On the main shaft 27 are mounted eccentrics 29, in pairs, each formed of a body 30 and a plate 31. See Fig. 6. The yoke 32 of one eccentric of each pair connects to one end of the rod 15 and to one end of a link 33 which also connects to the other rod 14 and keeps the rods positioned. The other yokes 35 of the other two eccentrics receive pins 36, which are carried at the inner ends of levers 37, which are pivoted on pins 38 carried by the sides 2 and 3. The outer ends of these levers carry the ends of the rod 14. By this mechanism, the rods 14 and 15 will be moved up and down in substantially vertical paths when the main shaft 27 is turned. As this movement occurs during both the forward and backward movement of the crank 8, the gears must be proportioned accordingly. Springs 40 may be employed to prevent back-lash when the parts become worn, which springs connect to the yokes 31 and to the rod 12. See Fig. 3.

*The multiplicand key board.*—The lower or multiplicand key-board is formed of two rectangular plates 42 and 43, properly secured to the front bar 44 and the rear bar 45. See Figs. 14 and 15. Keys are slidably mounted in these plates and are as shown in Fig. 9, differing slightly from the keys of the upper board. The button 48 at the upper end is provided with a character as shown in Fig. 15. The shank 49 has a notch 50, adapted to receive the locking bar 51. (Figs. 14 and 15.) An inclined portion 52 ends at the shoulder 53. The lower or inner end 54 is preferably square and has a lip 55 at its lower end which prevents the spring 56 from forcing the key out of the board. The spring engages the small pin 57 of the key with one end and its other end extends into a small hole in the plate 43. The plate 43 is preferably formed of a series of narrow strips, having notches to receive the parts 54 of the shank, so that the parts may be easily assembled, the ends of these strips being secured to the front bar 44 and the rear bar 45. The number of rows of keys will depend upon the character of work that is to be performed and upon the size of the key-board of the adding machine 10. It will be readily seen that when the wrong key in a row is depressed, depressing a second key in that row will force the locking bar 51 toward the rear so far that the first key will be released. These bars have slots 58 through which the small screws 59 extend into the plate 42, the heads of these screws slidably supporting the locking bars. Springs 61 connect to small pins carried by the locking bars 51 and by the upper plate 41 and normally hold the locking bars in their forward position. Along and in contact with the front ends of the locking bars 51, extends a bar 63, carried by screws 64. A link 65 connects to this bar and to the arm 66 of a bell-crank lever mounted on the pin 67, extending down from the plate 42. The other arm 68, connects to the link 69 and thereby to a pin 70 which extends down from a flange 71 on a plate 72. This plate has small pintles 73 which are properly journaled in the small blocks 74 secured beneath the left side of the upper plate 42. When this plate is swung inward, as shown in dotted lines in Fig. 16, the link 69 is moved to the left, and the bar 63 is moved back, and with it, all the locking bars 51, thus releasing all the depressed keys. This is always done when the lower key-board is returned to its initial position, the plate 72 serving as a handle by means of which the key-board may be moved. The key-board is moved to the left by the spring 75 which connects to it near its right edge and also connects to the link 33 at the left side of the machine. Projecting rearwardly from the key-board is an arm 76, the use of which will be explained later on. The springs 40 also serve to carry a portion of the weight of this key-board.

It may happen that the keys 9 of the adding machine are not all depressible the same distance, because of imperfect workmanship. If the ends 54 of the keys all engage directly with these adding machine keys, it is very possible that such keys 9 may be arrested before the key-board of this multiplying machine has reached the lower limit of its stroke and thus cause breakage. The key shown in Fig. 9 may be provided with a yieldable presser plate 106 on a stem 107, having a circumferential groove into which the pin 108 extends, to prevent the spring 109 from forcing the stem 107 entirely out of the bore 110 of the key. This spring should always be stiffer than the return springs of the keys of the adding machine, but should yield before any parts of either machine are broken. It will be understood that these plates 106 and the springs may be omitted if not necessary.

*The multiplier key-board.*—Referring to Figs. 10 and 12, it will be seen that this keyboard is a section of a cylinder having the upper shaft 21 as a center. It is formed by an outer plate 80 and an inner plate 81. A bar 82 at their lower edges connects to these plates and to the rod 12. A vertical side bar 83 extends down from each rear corner of the outer plate 80 and is secured to the rod 13. A cross bar 84 extends between the side bars 83 and to it the upper and lower plates are secured. The inner plate 81 may be of one piece with square holes for the portions 86 of the shanks of the keys. (Fig. 24.) The buttons 87 of these keys fit quite tightly, but may be removed to permit the keys being pushed up into place, after which the buttons are replaced. These keys may have shanks 88, notches 89, inclines 90, pins 91 for the springs 92, and lips 93, similar to those of the keys of Fig. 9 before described. Pins 94 prevent the keys from being depressed too far. The keys when depressed, are held in position by means of slidable bars 96, curved to fit the outer plate 80, and are slidable on the screws 97. Springs 98 normally hold these locking bars forward or downward. Their operation is similar to that of the bars 51 previously described. To release the keys, these bars are moved backward or upward in a manner similar to the movement of the bars 51 under pressure of the bar 63. Extending along the lower edge of the outer plate 80 is a bar 98, (Fig. 22) slidably mounted on the screws 99. A shoulder 100 on this bar is engaged by the roller 101, carried by the lower key-board, just before the latter reaches its right-hand or starting position. The roller 101 is carried by an arm 102 of a small lever mounted on a pin 103 on a bracket 104, which bracket is secured to the rear end of the lower key-board. A spring 111 connects to the other arm 112 of this lever and normally holds this roller elevated. When the lower key-board moves to the left, the roller 101 passes the shoulder 100 by swinging down, as shown in dotted lines in Fig. 22. It will be clear that if this roller were to remain in the position shown in dotted lines, the keys of the upper board would remain depressed. This is sometimes desirable, as when a series of numbers are to be multiplied by the same figure. A shank 114 (Fig. 23) is slidable in the upper plate 42 of the lower key-board and has a button 113 at its upper end. Its lower end connects to a small lever 115, pivoted on the pin 116 in the post 117. The rear end of this lever extends beneath the arm 112 of the adjacent lever. The shank 114 has a notch 118 adapted to receive the upper plate 42. When this key is depressed and pushed back to the position shown in dotted lines in Fig. 23, the roller 101 will be held in the position shown in dotted lines in Fig. 22, and the lower key-board may then move back and forth without affecting the keys of the upper key-board.

*The escapement.*—The upper shaft is turned backward and forward by the actuating crank 8 for each row of keys of the upper key-board in which a key has been depressed. An arm 120 (Figs. 14 and 15) having a hub 121 is slidable on this shaft and on a feather 122 secured thereto. When the end of this arm 120 engages a depressed key, as shown in dotted lines in Fig. 10, the forward stroke of the actuating crank 8 ends and the backward stroke begins. On the hub 121 are two flanges, 123 and 124, between which the upwardly extending portion 125 of the arm 76 moves freely up and down. As this arm 76 is connected to the lower key-board, the position of this hub 121 will determine the position of the lower keyboard, which moves to the left under pull of the spring 75 and is moved to the right by hand.

Secured on the hub 121, against the flange 124, is a disk 127, preferably of hard steel, and it carries a pin 128 on which is mounted the releasing lever 129. (See Figs. 19, 20, and 21.) A spring 130 normally holds the rear end of this lever in the position shown in solid lines in Fig. 19. On the arm 120 is pivoted a lever 131, having a curved finger 132 on its outer end, which lever engages the lever 129 with its inner end. On the arm 76 is pivoted a link 133, having a roller 134 at its front end, and normally held against the adjusting screw 135 by a light spring 138.

Referring to Fig. 12, a series of pivoted stop-arms 136 and 137 will be seen, as well as the disk 127 in dotted lines. These stop-arms prevent the disk 127, the arm 76 and the lower key-board from moving to the left, (to the right in Fig. 12, which is a rear elevation) and the mechanism just above described is adapted to push these stop-arms out of the path of the disk 127 at the proper times. In Figs. 10 and 19, the ends of the arms 136 and 137 are indicated in the path of the disk 127. It is the duty of the lever 129 to swing these arms 136 and 137 out of this path. While the arm 120 is swinging up from the position shown in solid lines in Fig. 19 to that shown in dotted lines, and back, the lower key board moves up and down nine times (or a less number depending upon the key depressed and the distance the arm 120 moves) the arm 76 moving as shown by solid and dotted lines. While this occurs, the disk 127 presses against the lower end of an arm 136 or 137 under pull of the spring 75. As the arm 120 approaches the end of its return stroke, the arm 76 moves up, both reaching the end of their strokes at the same time. The finger 132 will contact with the roller 134 and swing up, thereby swinging the lever 129 (as shown in dotted lines) whose rear arm will swing out the lower end of the arm 136 or 137. The disk 127 can now move freely to the left under pull of the spring 75 until it engages the next arm 137. It will be noticed that this movement occurs while the crank 8 is in its normal vertical position, and that the releasing lever 129 operates at the end of the stroke of the arm 120, irrespective of the distance which this arm traveled, whether it moved to the lowest or to the highest key of the board. When the arm 120 again moves upward, the spring 138 permits the roller 134 to move up with the finger 132 until they disengage.

The stop-arms 136 and 137 are shown in Figs. 10 to 13 inclusive. There is one arm 136 for the row of "units" keys of the multiplier key-board and an arm 137 for each of the other denominations. The theory on which this machine is constructed, is, that there will always be a "units" figure in the multiplier. If the figure to be used as the multiplier ends in one or more zeros, these are disregarded, and merely added to the result. The arm 136 therefore, will be used at each multiplication. It is not necessary therefore to latch this arm into or out of the path of the disk 127. As it always engages the disk 127, it may be desirable to mount a small roller 140 at its lower end, and a similar roller may also be mounted at the ends of the arms 137. All there arms are mounted loosely on the rod 13 and are positioned by the bars 83 and sleeves 141. (See Figs. 10 to 13 inclusive.) Each arm 137 has an upwardly projecting tooth 142, and each arm carries a pin 143. Springs 144 connect to these pins and to the yoke 145 mounted on the bars 83. On a rod 146 carried by the bars 83, and positioned by these bars and the sleeves 147, are latches 148, one for each row of keys above the "units" row. These latches have notches 149 to receive the teeth 142 on the stop-arms, and connect to the arms 150 which carry adjustable screws 151. The latches and arms are connected by the short hubs 156. Springs 152 extend from the pins 153 to the yoke 145 and normally hold the upper arms 150 forward. The locking bars 96 of the keys have downwardly extending ends 155 which are engaged by the screws 151, carried by these arms 150. The spring 144 tends to hold the lower end of the arm 136 forward, and the normal position of the arms 137 is as shown in Fig. 13. When a key is depressed in the upper board, the bar 96 of that denomination moves up and its end 155 moves backward, engaging the screw 151 and causing the arm 150 to move back and the latch 148 forward. The tooth 142 will immediately snap back into the notch 149 and the arm 137 will swing to the position shown in dotted lines in Fig. 11, into the path of the disk 127. Where no keys are depressed, the arms 137 will remain in their rear position and the disk 127 will freely pass the same. Thus multiplication is performed only where keys are depressed. When the arms 137 are thrown outward by the lever 129, they are normally held outward through the latches 148, as shown in Fig. 13, permitting the arm 125 to freely move to the right. Should any arm 137 be released for any reason, and swung into the path of the arms 125 and disk 127, it will be pushed out of the way by the small cam 158 at the upper end of the arm 125 on its return movement.

As before explained, the small roller 101 engages the cam 100 on the bar 95, on the return movement of the lower key-board, thereby forcing up this bar and all the locking bars 96 of the upper key-board. This occurs just before the lower key-board reaches its starting or righthand position. The result is that all the arms 137 will be swung forward through the action of the down-turned ends 155, screws 151, arms 150 and latches 148. To swing out these arms, mechanism is provided as follows. A plate 160, shown in plan in Fig. 17, has pintles 161 pivoted in the bars 83. A small lip 162 (Fig. 12) prevents the rear edge of this plate from swinging down too far. The rear edge of this plate has a downturned lip 163 in the form of a cam, adapted to be engaged by the dog 164, pivoted on the pin 165 on the upper end of the arm 125. (Figs. 19 and 21.) This dog will freely swing to the right (to the left in Fig. 20) when it moves to the left, but is returned to upright position by the spring 166. When this dog travels back along under the cam 163, the outer edge of the plate 160 will be lifted and will engage the shoulders 168 on the arms 137, swinging the arms outward. As the dwell of this cam 163 is longer than that of the shoulder 100, the arms 137 will be held out after the roller 101 has passed the shoulder 100, thus making certain that these arms will all be in their rearward position when the lower key-board is in its initial position and when the first key of the multiplier key-board is depressed.

*Operation.*—The operator faces the keyboards, and the lower key-board is at the right ends of the rods 14 and 15 and the crank 8 is vertical. The operator then presses in the proper keys of the lower keyboard to indicate the multiplicand, no keys being actuated in the rows of those denominations where ciphers occur in the multiplicand. He next depresses the proper keys of the multiplier key-board, disregarding the ciphers at the right end of the number. The crank 8 is then swung forward, causing the lower key-board to move up and down and its selected keys to depress the corresponding keys of the adding machine. One half of the movements indicated by the depressed key of the upper board will occur during the forward movement of the crank and one half on the return stroke, the range of movement being determined by the selected key. At the end of the return movement of the crank, the escapement operates and the lower key-board moves to the left under the pull of the spring 75. If a key was depressed in the "tens" column, the lower key-board will stop so its "units" keys will be directly in line with the "tens" keys of the adding machine. The crank is then swung forward and back, causing the depressed keys of the lower key-board to actuate the keys of the adding machine of next higher denominations than before, as many times as the figure of the depressed key of the upper board indicates. If no key has been depressed in the "tens" column of the upper board, the lower key-board, when released after its "units" movements, will slide along on the rods 14 and 15, until stopped by the proper arm 137 of the next denomination in which a key has been depressed. The lower key-board is returned by swinging the plate 72 to the right and carrying the board with it. This causes the locking bars 51 to release all the depressed keys of the lower key-board and the roller 101 causes the locking bars 96 to release all the depressed keys of the upper board. When the lower key-board has reached its initial or right-hand position, the multiplying machine is ready to be operated again. The product is read off the adding machine registers and the dropped ciphers, if any, of the multiplier added thereto.

Having now explained our construction, what we claim as our invention and desire to secure by Letters Patent is:—

1. In a multiplying machine, the combination of a frame to receive an adding machine provided with keys, a keyboard mounted on the frame and provided with keys adjustable to indicate the multiplier, a second keyboard mounted on the frame and provided with adjustable keys to indicate the multiplicand, means to move the second key-board up and down according to the selected figures of the first key board so as to actuate the keys of the adding machine, and means to move the second keyboard laterally to position it in accordance with the different denominations of the figures on the selected keys of the first key-board.

2. In a multiplying machine, the combination of a frame to receive an adding machine provided with keys, a stationary multiplier key-board, adjustable keys thereon, a multiplicand key board, depressible keys mounted thereon, means controlled by the adjusted keys of each denomination of the multiplier key-board for moving the multiplicand key-board up and down so its depressed keys will actuate the keys of the adding machine, and mechanism for shifting the multiplicand keyboard laterally to engage keys of the adding machine of different denominations.

3. In a multiplying machine, the combination with a key-board adapted to extend over an adding machine, keys adjustably mounted on the key-board, a driving mechanism adapted to move the key-board up and down, a second key-board adjacent the first, adjustable keys mounted thereon to control the operation of the driving mechanism, and means for shifting the first key board laterally so its keys will engage groups of keys of the adding machine of different denominations.

4. In a multiplying machine, the combination of a frame, a key-board movably mounted therein, a series of sets of keys mounted in the key-board and adapted to be positioned by the operator to indicate a desired figure, means to move the key-board up and down to actuate the keys of an adding machine, a second key-board, a series of sets of keys mounted in the same and adapted to be positioned by the operator to indicate a desired figure, and an actuating device and an escapement for the first key-board controlled by the keys of the second key-board, said escapement controlling a lateral movement of the first key-board.

5. In a multiplying machine, the combination of a key-board adapted to extend over an adding machine, keys adjustably mounted on the key-board, a driving mechanism to move the key-board up and down, means to move the key-board laterally, a second key-board adjacent the first, depressible keys mounted therein to control the operation of the driving mechanism, bars to lock these keys in depressed position, and means mounted on the first key-board to move the key-locking bars of the second key board to inoperative position.

6. In a multiplying machine, the combination of a key-board adapted to extend over an adding machine, keys adjustably mounted on the key-board, a driving mechanism to move the key-board up and down, means to move the key-board laterally, a second key-board adjacent the first, depressible keys mounted therein to control the operation of the driving mechanism, bars to lock these keys in depressed position, means mounted on the first key-board to move the key-locking bars of the second key board to inoperative position, and adjustable means mounted on the first keyboard to render the releasing device inoperative.

7. In a multiplying machine, the combination of a frame, a key-board mounted therein and comprising parallel rows of sets of keys, means to move the key-board up and down, a spring to move it laterally, a second key-board mounted in the frame and comprising parallel rows of sets of keys, the second key-board to stop the first key-board, and means to release the second key-board so it may move along to the row of keys of the second key-board next higher in denomination.

8. In a multiplying machine, the combination of a frame to receive an adding machine provided with keys, a key-board mounted on the frame and provided with a series of parallel rows of keys adjustable to indicate the multiplier, a second key-board mounted on the frame and provided with a series of parallel rows of adjustable keys to indicate the multiplicand, means to move the second key-board up and down according to the selected figures of the first key board so as to actuate the keys of the adding machine, means to move the second key-board laterally to position it in accordance with the different denominations of the figures on the selected keys of the first key-board, and means actuated by the keys of each row to arrest the second key-board when any of the keys in that row are adjusted.

9. In a multiplying machine, the combination of a frame to receive an adding machine provided with keys, a stationary multiplier key-board, a series of rows of adjustable keys thereon, a multiplicand key board, a series of rows of depressible keys mounted thereon, means controlled by the adjusted keys of each denomination of the multiplier key-board for moving the multiplicand key-board up and down so its depressed keys will actuate the keys of the adding machine, mechanism for shifting the multiplicand key-board laterally to engage keys of the adding machine of different denominations, and a stop mechanism for the multiplicand key-board connected to each row of keys of the multiplier key-board.

10. In a multiplying machine, the combination of a key-board adapted to extend over an adding machine, keys adjustably mounted on the key-board, a driving mechanism adapted to move the key-board up and down, a second key-board adjacent the first, adjustable keys mounted thereon to control the operation of the driving mechanism, means for shifting the first key board laterally so its keys will engage groups of keys of the adding machine of different denominations, and a stop mechanism for each row of keys of the second key-board whereby the first key-board will be retained in proper position during its movement by the driving mechanism corresponding to the adjusted key of that row of the second key-board.

11. In a multiplying machine, the combination of a frame, a shaft mounted therein, a stationary key-board in the form of a section of a cylinder having said shaft as a center, a series of rows of depressible keys therein, a hub and arm slidable on the shaft and revoluble therewith, said arm adapted to be limited in its movement by said keys when depressed, a second key-board, actuating means to move said second key-board up and down, connections between said key-board actuating means and said arm whereby the reciprocations are controlled by the depressed keys of the stationary key-board, means to move the second key-board laterally, an escapement mounted adjacent to the stationary key-board and controlled thereby, and connections between the second key-board and said hub and arm whereby the movements thereof may be controlled by said escapement.

12. In a multiplying machine, the combination of a frame, a multiplicand key-board mounted therein, means to move the same laterally, actuating mechanism to move the same up and down, a rearwardly extending arm connected thereto, a shaft mounted in said frame, a hub slidable thereon and having a groove to receive said arm so said hub and key-board will move laterally together, a multiplier key-board, rows of depressible keys mounted therein, means connected to said actuating mechanism movable in the lines of the rows of said keys to engage the same when depressed and limit the movement of the actuating mechanism, a series of arms, one for each row of keys, controlled by said keys and extending into the path of said arm and hub, and means for moving said arms out of the path of said hub to permit lateral movement of the multiplicand key-board.

13. In a multiplying machine, the combination of a frame, a movable and a stationary key-board mounted therein, a series of rows of adjustable keys mounted in each key-board, the keys of each row numbered from 1 to 9, actuating mechanism to move one of the key-boards toward and from an adding machine whose keys will be actuated by the adjusted keys of the movable key-board, and means engaging the adjusted keys of the stationary key-board to limit such movements according to the adjusted keys.

14. In a multiplying machine, the combination of a frame, a movable and a stationary key-board mounted therein, a series of rows of adjustable keys mounted in each key-board, the keys of each row numbered from 1 to 9, actuating mechanism to move one of the key boards toward and from an adding machine whose keys will be actuated by the adjusted keys of the movable key-board, means engaging the adjusted keys of the stationary key-board to limit such movements according to the adjusted keys, and means to position the movable key-board with respect to the adding machine according to the denomination of the selected keys of the stationary key-board.

15. In a multiplying machine, the combination of a frame, a stationary key-board mounted therein, a series of parallel rows of adjustable keys in said board, a locking bar for each row of keys, a shaft mounted below said key-board, a hub slidable thereon and revoluble therewith, means connected to said hub and movable adjacent the key-board to engage the adjusted keys and thereby limit the movement of the shaft, a series of movable arms adjacent the shaft, one for each row of keys, means actuated by said locking bars to swing said arms into the path of said hub, a second key-board, actuating mechanism to move the same up and down, connections between said shaft and actuating mechanism whereby the number of such movements will be controlled by the keys of the stationary board, means to move the second key-board laterally, connections between said hub and the movable key-board whereby the lateral movement will be limited by said arms, and means mounted on the hub to move the arms out of the path of the hub.

16. In a multiplying machine, the combination of a frame, a shaft mounted therein, a disk slidable thereon, a key-board curved around the shaft, a series of arms extending downward from the key-board and movable into the path of said disk, a series of keys in a row for each arm, means movable by the keys of each row to cause the arm to swing into the path of the disk, means to slide the disk along the shaft until it engages an arm, and a lever mounted on the disk to swing the arm out of the path.

In testimony whereof, we have signed this specification in the presence of two subscribing witnesses.

STEPHEN HORR.
WILLIAM B. TRAVIS.

Witnesses as to the signature of Stephen Horr:
EDWARD N. PAGELSEN,
ELIZABETH M. BROWN.

Witnesses as to the signature of William B. Travis:
H. C. CONRAD,
CULA F. CROSS.